(12) United States Patent
Diepstraten (10) Patent No.: US 12,493,157 B2
(45) Date of Patent: Dec. 9, 2025

(54) FIBER OPTIC CABLE TERMINAL WITH A PUSHABLE STUB CABLE

(71) Applicant: COMMSCOPE TECHNOLOGIES LLC

(72) Inventor: Patrick Jacques Ann Diepstraten, Heusden-Zolden (BE)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 18/589,544

(22) Filed: Feb. 28, 2024

(65) Prior Publication Data

US 2024/0272350 A1 Aug. 15, 2024

Related U.S. Application Data

(63) Continuation of application No. 18/167,179, filed on Feb. 10, 2023, now Pat. No. 11,934,006, which is a continuation of application No. 16/982,359, filed as application No. PCT/US2019/022880 on Mar. 19, 2019, now Pat. No. 11,579,357.

(60) Provisional application No. 62/645,436, filed on Mar. 20, 2018.

(51) Int. Cl.
*G02B 6/38* (2006.01)
*G02B 6/02* (2006.01)
*G02B 6/44* (2006.01)

(52) U.S. Cl.
CPC ........ *G02B 6/4411* (2013.01); *G02B 6/02395* (2013.01); *G02B 6/44465* (2023.05); *G02B 6/44515* (2023.05); *G02B 6/44528* (2023.05)

(58) Field of Classification Search
CPC .............................. G02B 6/3897; G02B 6/443
USPC .......................................................... 385/135
See application file for complete search history.

(56) References Cited

U.S. PATENT DOCUMENTS

| 5,425,121 A | * | 6/1995 | Cooke | G02B 6/3897 385/112 |
| 6,160,940 A | * | 12/2000 | Summers | G02B 6/4489 385/113 |
| 6,736,156 B2 | | 5/2004 | Beals et al. | |
| 7,292,763 B2 | * | 11/2007 | Smith | G02B 6/4446 385/134 |

(Continued)

FOREIGN PATENT DOCUMENTS

| EP | 1042696 B1 | 1/2002 |
| EP | 1281096 B1 | 10/2005 |

(Continued)

OTHER PUBLICATIONS

International Search Report and Written Opinion of the International Searching Authority for International Patent Application No. PCT/US2019/022880 mailed Aug. 9, 2019, 12 pages.

(Continued)

*Primary Examiner* — Kaveh C Kianni
(74) *Attorney, Agent, or Firm* — Merchant & Gould P.C.

(57) ABSTRACT

A fiber optic cable terminal proximally terminates a stub cable carrying one or more optical fibers. The stub cable is structurally adapted to be advanced through at least a portion of a conduit by distally pushing a distal end of the stub cable from a location that is proximal to a proximal end of the conduit and without applying any pulling force at any location that is distal to the proximal end of the conduit.

15 Claims, 10 Drawing Sheets

(56) References Cited

U.S. PATENT DOCUMENTS

| | | | | |
|---|---|---|---|---|
| 7,558,458 | B2* | 7/2009 | Gronvall | G02B 6/4472 |
| | | | | 385/134 |
| 7,590,322 | B2 | 9/2009 | Puzan et al. | |
| 7,665,902 | B2 | 2/2010 | Griffioen et al. | |
| 7,936,957 | B1* | 5/2011 | Puzan | G02B 6/4494 |
| | | | | 385/112 |
| 7,974,507 | B2* | 7/2011 | Lovie | G02B 6/52 |
| | | | | 385/100 |
| 8,439,577 | B2 | 5/2013 | Jenkins | |
| 8,639,649 | B2 | 1/2014 | McSherry et al. | |
| 9,377,599 | B2 | 6/2016 | Smith et al. | |
| 9,477,056 | B2 | 10/2016 | Abernathy et al. | |
| 9,553,669 | B2* | 1/2017 | Khemakhem | G02B 6/4441 |
| 10,788,641 | B2* | 9/2020 | Larsson | B65H 49/36 |
| 11,029,477 | B2* | 6/2021 | Sato | G02B 6/441 |
| 11,422,327 | B2* | 8/2022 | Geens | G02B 6/4454 |
| 11,579,357 | B2 | 2/2023 | Diepstraten | |
| 11,835,780 | B2 | 12/2023 | Larsson et al. | |
| 11,934,006 | B2 | 3/2024 | Diepstraten | |
| 2002/0040731 | A1* | 4/2002 | Beals | G02B 6/545 |
| | | | | 137/317 |
| 2006/0147163 | A1* | 7/2006 | Mayhew | G02B 6/52 |
| | | | | 385/100 |
| 2008/0219627 | A1* | 9/2008 | Puzan | G02B 6/4494 |
| | | | | 385/109 |
| 2010/0067857 | A1* | 3/2010 | Lovie | G02B 6/52 |
| | | | | 385/113 |
| 2014/0334791 | A1* | 11/2014 | Smith | G02B 6/47 |
| | | | | 385/135 |
| 2015/0268434 | A1* | 9/2015 | Barnette, Jr. | G02B 6/4472 |
| | | | | 385/135 |
| 2019/0033547 | A1* | 1/2019 | Larsson | B65H 59/04 |
| 2020/0041739 | A1* | 2/2020 | Sato | G02B 6/02395 |
| 2021/0011239 | A1* | 1/2021 | Geens | G02B 6/44526 |
| 2022/0120975 | A1* | 4/2022 | Geens | G02B 6/44465 |
| 2022/0155546 | A1* | 5/2022 | Larsson | B65H 59/04 |
| 2024/0272350 | A1* | 8/2024 | Diepstraten | G02B 6/4411 |

FOREIGN PATENT DOCUMENTS

| | | | |
|---|---|---|---|
| EP | 1423743 | B1 | 11/2005 |
| EP | 2012153 | A1 | 1/2009 |
| EP | 2031719 | B1 | 1/2013 |
| EP | 1855134 | B1 | 10/2016 |
| EP | 3324227 | A1 | 5/2018 |
| EP | 2926181 | B1 | 4/2020 |
| FR | 2663795 | A1 * | 12/1991 |
| GB | 2558567 | B | 12/2021 |
| GB | 2600001 | B | 3/2023 |
| WO | WO-0237925 | A2 * | 5/2002 ............ F16L 7/00 |
| WO | 20170139358 | A1 | 8/2017 |
| WO | 20180144529 | A1 | 8/2018 |
| WO | 20180146470 | A1 | 8/2018 |
| WO | 2019053146 | A1 | 3/2019 |
| WO | 20190126303 | A1 | 6/2019 |

OTHER PUBLICATIONS

European Search Report for EP Application No. 19771409.0 mailed Oct. 22, 2021, 8 pages.

Dodds, Chris, "Introducing QKWconnect from Emtelle," https://www.cablejoints.co.uk/blog/article/introducing-qwkconnect-from-emtelle, Oct. 26, 2016, 6 pages.

Pre-Connectorised EPFU, Prysmian Group—Accessories—Prysmian Draka—AC027, Issue 01, Feb. 2013 (6 pgs).

* cited by examiner

FIBER OPTIC CABLE TERMINAL WITH A PUSHABLE STUB CABLE

CROSS-REFERENCE TO RELATED APPLICATIONS

This application is a continuation of application Ser. No. 18/167,179, filed Feb. 10, 2023, now U.S. Pat. No. 11,934,006, which is a continuation of application Ser. No. 16/982,359, filed Sep. 18, 2020, now U.S. Pat. No. 11,579,357, which is a 371 of international PCT/US2019/022880, filed Mar. 19, 2019, and claims the benefit of U.S. Patent Application No. 62/645,436, filed on Mar. 20, 2018, the disclosures of which are incorporated herein by reference in their entireties.

BACKGROUND

Subscribers to data/communications providers can be connected to data networks with optical fibers.

In some applications, the network includes sealable multi-fiber terminals at which a stub cable is terminated and then routed through a conduit to other telecommunications equipment, such as a fiber distribution hub, where the fibers from the stub cable can be separated, split, spliced, organized, stored, and/or connected to subscribers with drop cables.

Depending on the particular network application, the telecommunications equipment and/or the conduit(s) can be positioned or partially positioned on the ground, above the ground (i.e., aerially mounted or suspended), and/or or below the ground, e.g., in a hand hole. In specific applications, both the multi-fiber terminal and the conduit are positioned below ground.

Figure 1:
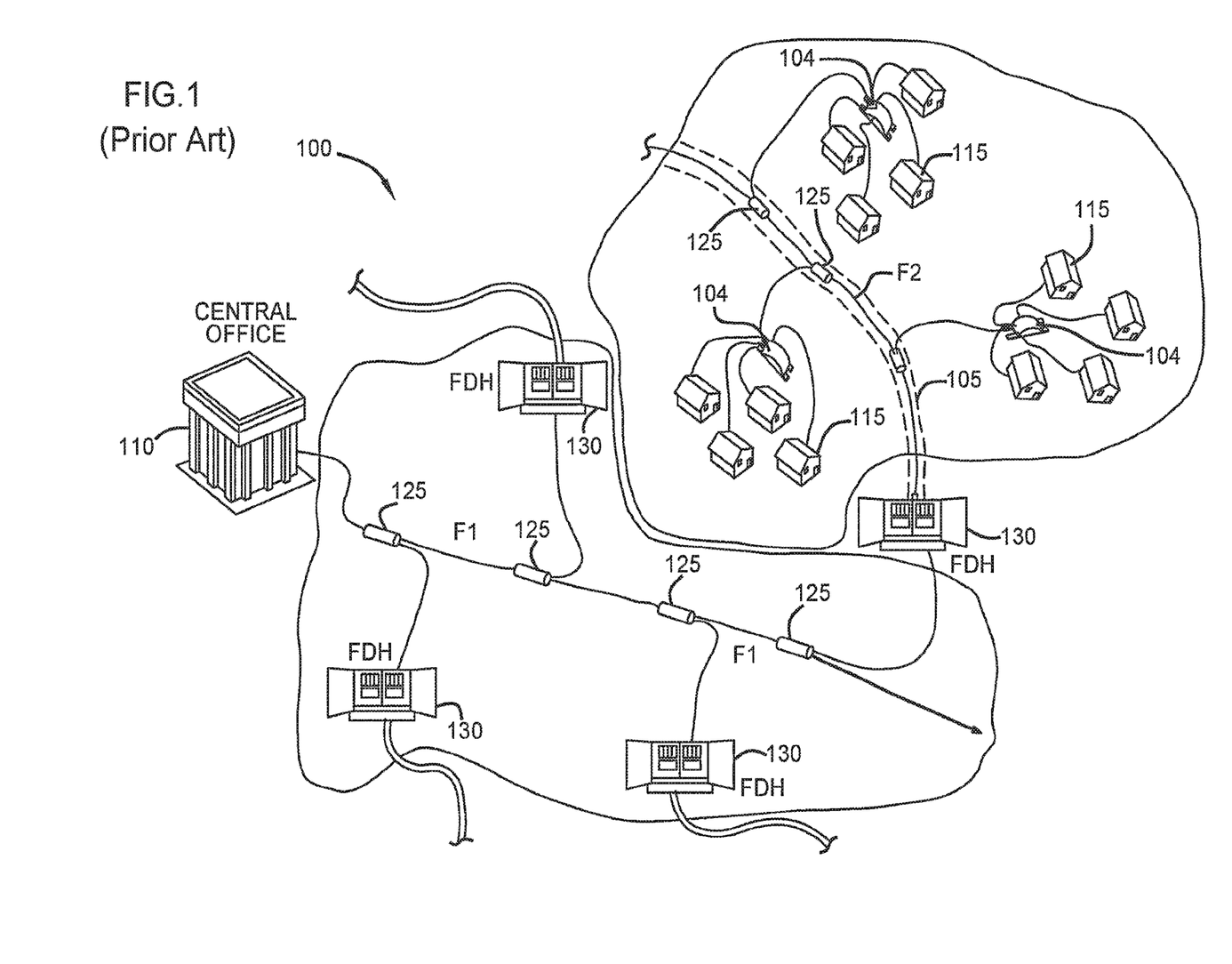
FIG. 1 shows a prior art fiber optic network.

FIG. 1 illustrates a network 100 deploying passive fiber optic lines. As shown in FIG. 1, the network 100 may include a central office 110 that connects a number of end subscribers 115 in a network. The central office 110 may additionally connect to a larger network such as the Internet (not shown) and a public switched telephone network (PSTN). The network 100 may also include fiber distribution hubs (FDHs) 130 having one or more optical splitters that generate a number of individual fibers that may lead to the premises of a subscriber 115. As mentioned, the various lines of the network can be aerial or housed within underground conduits (e.g., see conduit 105).

The portion of network 100 that is closest to central office 110 is generally referred to as the F1 region, where F1 is the "feeder fiber" from the central office. The portion of network 100 that includes an FDH 130 and a number of end users 115 may be referred to as an F2 portion of network 100. Splitters used in an FDH 130 may accept a feeder cable having a number of fibers and may split those incoming fibers into individual distribution fibers that may be associated with a like number of subscriber locations.

Referring to FIG. 1, the network 100 includes a plurality of breakout locations 125 at which branch cables (e.g., drop cables, stub cables, etc.) are separated out from main cables (e.g., distribution cables). Breakout locations can also be referred to as tap locations or branch locations and branch cables can also be referred to as breakout cables. At a breakout location, fibers of the branch cables are typically spliced to selected fibers of the main cable. However, for certain applications, the interface between the fibers of the main cable and the fibers of the branch cables can be connectorized. In some applications, the breakout location includes a sealable multi-fiber terminal adapted to connect the fibers of the main cable and the fibers of branch or stub cables. The multi-fiber terminal can include ports supporting adapters for optically connecting the fibers.

Stub cables are typically branch cables that are routed from breakout locations (e.g., a sealable multi-fiber terminal/drop terminal) to intermediate access locations such as a pedestals or hubs. Intermediate access locations can provide connector interfaces located between breakout locations and the actual subscriber locations. A drop cable is a cable that typically forms the last leg to a subscriber location. For example, drop cables are routed from intermediate access locations to subscriber locations.

FIG. 1 shows several branch cables routed to drop terminals 104. Drop terminals can be mounted on a variety of different structures. For example, a typical drop terminal may be mounted to a pole, a strand (e.g., a fiber optic cable or a copper cable) or inside a hand hole.

In telecommunications networks such as the one shown in FIG. 1, advancing a stub cable through a conduit (e.g., the conduit 105) from a multi-fiber terminal/drop terminal to an intermediate access location can be challenging, particularly when the conduit is underground and therefore difficult to access.

SUMMARY

Examples of fiber optic cable terminals (which include drop terminals) according to the present disclosure include an enclosure having a plurality of hardened/ruggedized ports that are environmentally sealed relative to the enclosure, each of the hardened/ruggedized ports adapted to receive a ruggedized/hardened fiber optic connector from outside the enclosure. The cable terminal includes a pushable stub cable holding at least one optical fiber optically coupled to the hardened/ruggedized ports. In some examples, the number of optical fibers included in the stub cable can equal the number of hardened/ruggedized ports of the cable terminal/drop terminal with each optical fiber being optically coupled to one of the ports. For example, for a 4 port cable terminal the stub cable would have 4 optical fibers, for an 8 port cable terminal the stub cable would have 8 optical fibers, and for a 12 port cable terminal the stub cable would have 12 fibers. Higher fiber counts could also be used. In other examples, the stub cable can have a single optical fiber and the enclosure can include a passive optical power splitter or wavelength division multiplexer having an input side coupled to the fiber of the stub cable and an output side having outputs coupled to each of the hardened/ruggedized ports.

According to certain aspects of the present disclosure, a fiber optic cable terminal comprises: a stub cable extending axially from a proximal end to a distal end of the stub cable, the stub cable including an outer jacket housing at least a first optical fiber; and a sealable closure sealingly coupled to the stub cable at a primary port defined by the sealable closure, the sealable closure having an interior volume and at least one secondary pluggable port adapted to receive an end of a second optical fiber routed to the sealable closure from outside the interior volume, wherein the stub cable is adapted (e.g., has one or more structural characteristics that adapt the cable) to be distally advanced by at least a predetermined minimum distance/desired installation distance into a conduit by applying only one or more pushing forces from a location that is proximal to a proximal end of the conduit.

The one or more structural characteristics can include one or more of the stub cable's rigidity, flexibility/resilience, and/or frictional characteristics of an outer surface of the stub cable, or one or more other characteristics of the stub cable.

The outer jacket of the stub cables of the present disclosure can be made from any suitable materials. In some examples, the jacket may be formed of a low smoke, zero halogen (LSZH) material, a polyethylene material (which is particularly well suited for outdoor uses), or other compounds, as best suited to the deployment environment.

Another characteristic of the stub cables of the present disclosure can include the stub cable's sag, which refers to the amount of droop (from the horizon) of one longitudinal end of the stub cable of given length that is clamped at the opposing longitudinal end. In some examples, stub cables of the present disclosure have a sag defined such that if a three foot length of the stub cable were supported by a clamp holding one end of the cable horizontal, the opposite end of the stub cable would not sag down more than 18 inches from the horizon. In other examples, the opposite end of the stub cable would not sag by more than 12 inches, such as less than 10 inches or less than 8 inches.

In some examples, the predetermined minimum distance/desired installation distance is a function of an inner diameter or inner width of the conduit passage and/or an outer diameter of the stub cable and/or or a path defined by the conduit, wherein the path can include one or more straight sections and/or one or more curved sections.

In some examples, an inner diameter of the conduit passage through which the stub cable is pushed is smaller than a minimum cross-dimension of the assembled cable terminal. In other words, the inner diameter of the conduit is small enough that the assembled cable terminal is not passable therethrough. In particular examples, the minimum inner diameter or width of the conduit passage is less than or equal to 12 mm, or less than or equal to 8 mm, or less than or equal to 6 mm, or less than or equal to 5 mm.

In some examples, the predetermined minimum distance/desired installation distance is at least partially a function of a total curvature of the conduit along the minimum distance, where the total curvature is defined as:

$$\alpha \int_{x0}^{x1} \frac{1}{r} dx,$$

where α is a constant, x0 is the proximal-most point of the path defined by the conduit, x1 corresponds to the distally-most advanced position of the stub cable at the predetermined minimum distance, and r is the radius of curvature of the conduit along the path.

In some examples, the predetermined minimum distance/desired installation distance is at least partially a function of a total twisting of the conduit along the minimum distance, where twisting is defined as a curvature of the conduit that has both a non-zero horizontal component and a non-zero vertical component.

In some examples, the predetermined minimum distance/desired installation distance is at least partially a function of frictional characteristics of an inner surface of the conduit. It should be appreciated that the pushable stub cable can encounter a conduit that is already populated with one or more cables. Thus, in some examples, the predetermined minimum distance/desired installation distance takes into account other cables already routed through the conduit, which could inhibit the stub cable's pushability.

According to further aspects of the present disclosure, a fiber optic cable terminal comprises: a stub cable extending axially from a proximal end to a distal end of the stub cable, the stub cable including an outer jacket housing a first set of optical fibers, the stub cable having a maximum outer transverse diameter or width; and a sealable closure sealingly coupled to the stub cable at a primary port defined by the sealable closure, the sealable closure having an interior volume and a plurality of secondary pluggable ports adapted to receive ends of a second set of optical fibers routed to the sealable closure from outside the interior volume, wherein the first set of optical fibers are adapted to be routed from the stub cable though the interior volume for optically connecting the first set of optical fibers to the second set of optical fibers via the secondary ports; wherein the stub cable is configured such that the distal end is distally advanceable by an advancing distance through an axially extending conduit having a minimum inner transverse diameter or width that is greater than the maximum outer transverse diameter or width of the stub cable by distally pushing the stub cable from a location that is proximal from a proximal end of the conduit and without distally pulling the stub cable from a location that is distal to the proximal end of the conduit; and wherein the advancing distance is at least ten times the minimum inner transverse diameter of the conduit.

In some examples, the advancing distance is at least 50 times, at least 100 times, at least 500 times, at least 1,000 times, at least 5,000 times, at least 10,000 times, or more, the minimum inner transverse diameter or width of the conduit passage, that inner width being smaller than a minimum cross-dimension of the closure.

In some examples, the fiber optic cable terminal comprises a stub cable organizing structure for organizing a portion of the stub cable that is not advanced into the conduit.

In some examples, the fiber optic cable terminal comprises a dispenser, e.g., a controllable electrical dispenser for automatically dispensing and distally advancing a length of the stub cable into the conduit.

In some examples, the cable organizing structure comprises a spool.

In some examples, the cable organizing structure is mounted to or integral with an exterior surface of the sealable closure.

In some examples, a plurality of plugs are coupled to the sealable closure for selectively plugging the secondary ports.

In some examples, the secondary ports include fiber optic adapters for optically connecting the first set of optical fibers to the second set of optical fibers.

In some examples, the first ends of the first set of optical fibers are disposed in the interior volume and/or the ends of the second set of optical fibers are terminated with optical fiber connectors.

In some examples, the distal end of the stub cable is distally advanceable through the proximal end of the conduit and a distal end of the conduit to a fiber distribution hub by distally pushing the stub cable from a location that is proximal to the proximal end of the conduit and without distally pulling the stub cable from a location that is distal to the proximal end of the conduit.

In some examples, the pushable stub cable is equally bendable in all directions, such that the pushable stub cable does not have a preferred bending axis.

In some examples, the pushable stub cable has a jacket with an outer surface/perimeter that defines flutes, ribs or other projections distributed about its perimeter for reducing friction with a conduit through which the stub cable is pushed. The projections extend longitudinally along the length of the cable.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Figure 2:
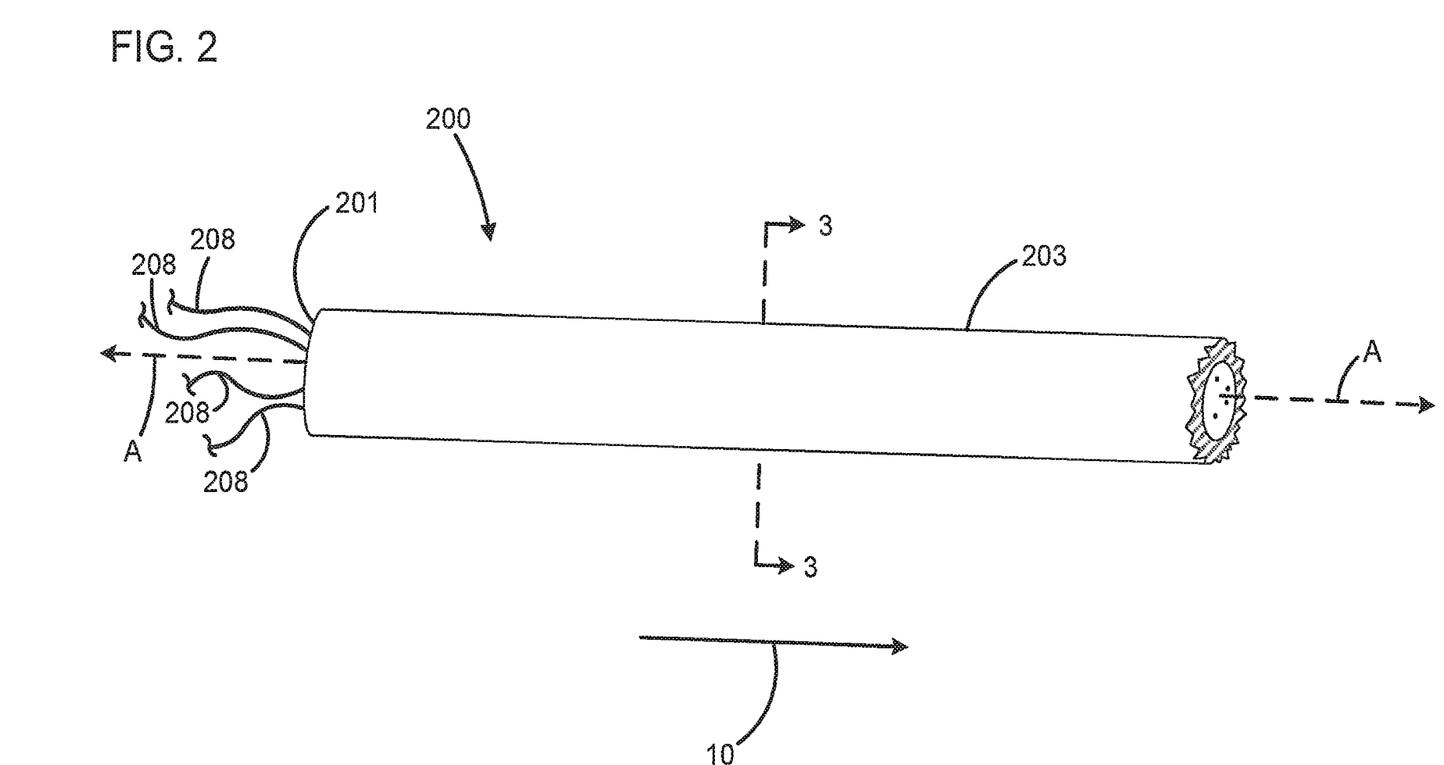
FIG. 2 depicts a portion of a stub cable in accordance with the present disclosure.
Figure 3:
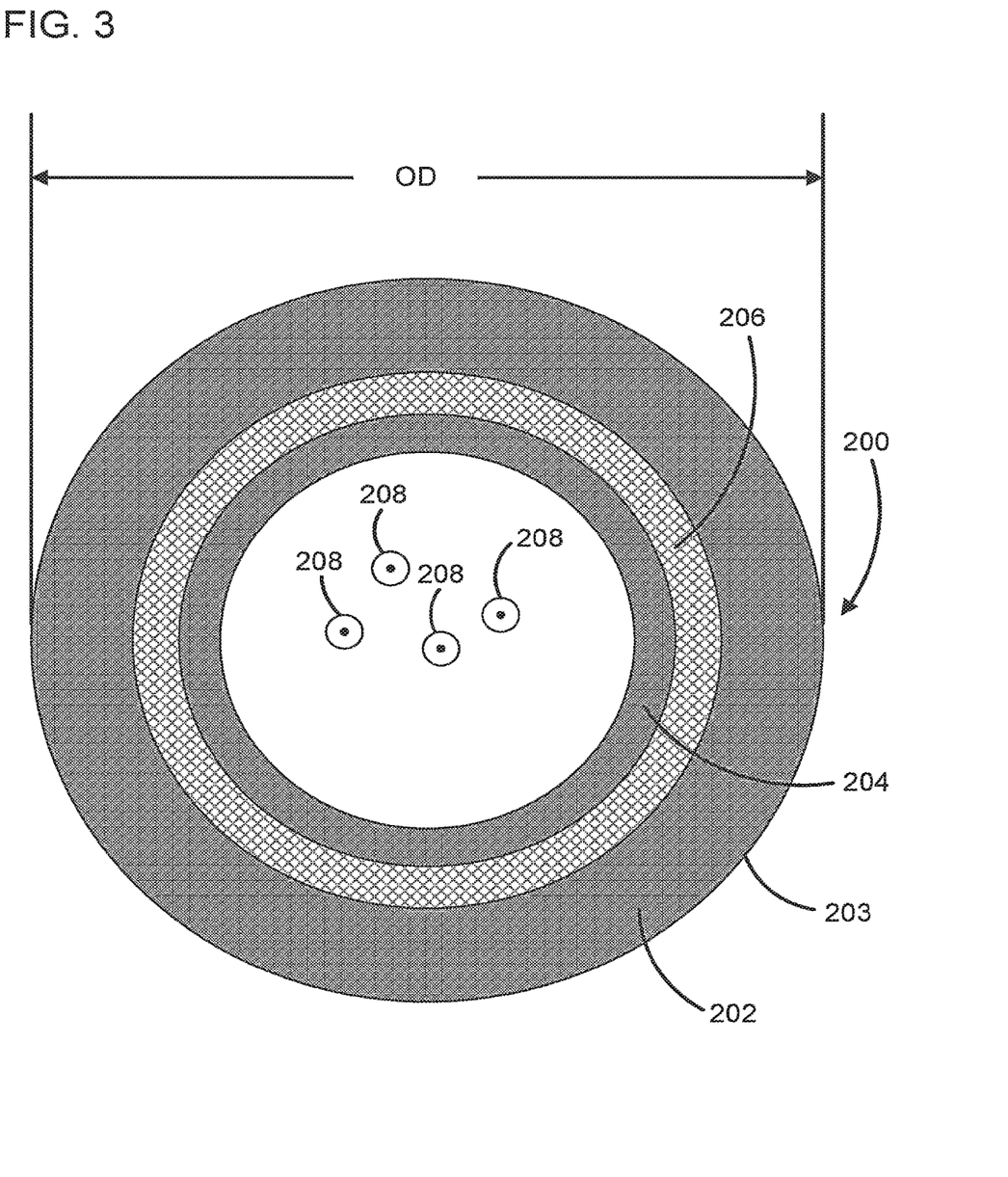
FIG. 3 depicts a cross-sectional view of the stub cable of FIG. 2 along the line 3-3 in FIG. 2.

Referring to FIGS. 2-3, a pushable stub cable 200 is defined by a central longitudinal axis A (into page in FIG. 3). The stub cable 200 can be flexible, e.g., spooled or bent. Thus, the axis A need not be straight, but rather simply follows the longitudinal path of the stub cable 200. In some examples, the stub cable does not have a preferred or preferred bending axis or axes.

The stub cable 200 has a proximal end 201 and extends axially (i.e., along the longitudinal axis A) in a longitudinally distal direction 10 towards a distal end (not shown). The axial length of the stub cable 200 can be any desired length, e.g., up to or greater than 1,000 meters.

By "pushable" is meant that the stub cable 200 has structural characteristics, e.g., rigidity, resilience, outer surface frictional characteristics, etc., such that the stub cable can be distally advanced, by at least a minimum or desired distance, within a conduit of a given size and defining a given path, by applying an advancing force to the stub cable only from a location that is proximal to a proximal end of the conduit. The structural characteristics that impart pushability can be characteristic of one, two, or all three dimensions of the stub cable. For example, in certain applications, higher rigidity may be more important in a radial/traverse dimension or dimensions than in the axial dimension of the stub cable.

In the case of a straight conduit, the structural characteristics of the stub cable 200 that impart pushability can include, primarily, the cable's rigidity relative to lateral/transverse loads and frictional characteristics of its outer surface. In the case of a conduit that has curvature or twisting (i.e., one or more non-straight segments), the resilience/flexibility of the stub cable also becomes important, as well as rigidity/resilience in the axial dimension of the stub cable.

The inner diameter or width of the conduit and/or the frictional characteristics of the inner surface of the conduit can also partially dictate how much the stub cable 200 can be distally advanced in the conduit by pushing alone.

It should be appreciated that, in some examples, the stub cable 200 is adapted to be advanced, by distally pushing alone, all the way to the distal end of a given conduit, or even beyond that. In other examples, the stub cable 200 is adapted to be advanced, by distally pushing alone, not as far as the distal end of the conduit. In such examples, other methods can be employed, e.g., pulling the stub cable 200 the remaining distance from the distal end of the conduit, in order to complete the desired routing of the stub cable 200.

In addition, in at least some examples it is desirable that the stub cable is sufficiently flexible and resilient to be spoolable for purposes of organizing and storing undeployed lengths of the stub cable.

The example stub cable 200 includes an outer jacket 202 defining an outer surface 203 of the stub cable 200. In this example, the outer surface 203 has a substantially constant curvature. In other examples, the outer surface can have non-constant curvature. For example, the outer surface can define one or more radial undulations that can provide for a fluted or otherwise configured outer jacket of the stub cable 200.

Optionally, interior (i.e. closer to the axis A) to the outer jacket 202 the stub cable 200 can include strength member material 206 (e.g., aramid yarn). The stub cable 200 can alternatively include any configuration of a strength member or members and/or strength member material, and/or no strength members at all. Optionally the stub cable 200 also includes an inner tube/buffer tube 204, which can be interior to the strength member material 206.

The stub cable 200 carries a plurality of coated optical fibers 208. Each coated optical fiber 208 can correspond to a single fiber or multiple (e.g., ribbonized) fibers. In this example, the stub cable 200 carries a total of four single optical fibers 208. However, any number of fibers can be carried by the stub cables of the present disclosure, including any number from one optical fiber to tens, hundreds, or even thousands of optical fibers. The optical fibers can be held loosely in the stub cable 200 or affixed (e.g., embedded) in the stub cable 200.

The transverse cross-section of the example stub cable 200 is substantially round. Alternatively, the transverse cross-section can be another shape, e.g., elongated in one dimension.

The stub cable 200 has a maximum outer diameter or maximum outer width OD. In some non-limiting examples the stub cable 200 has an OD that is less than, e.g., 12 mm, or less than 8 mm, or less than 6 mm, or less than 5 mm. The OD can alternatively be larger than these values. In some examples, the stub cable 200 has an OD of 3.5 mm and is pushed through a conduit having an ID of 5 mm.

Non-limiting examples of pushable cables that can correspond to the stub cable 200 are described in International Application No. PCT/US2018/16129 filed on Jan. 31, 2018, and in U.S. Provisional Application Ser. No. 62/607,639 filed on Dec. 19, 2017, the contents of which applications are hereby fully incorporated by reference in their entireties.

Figure 4:
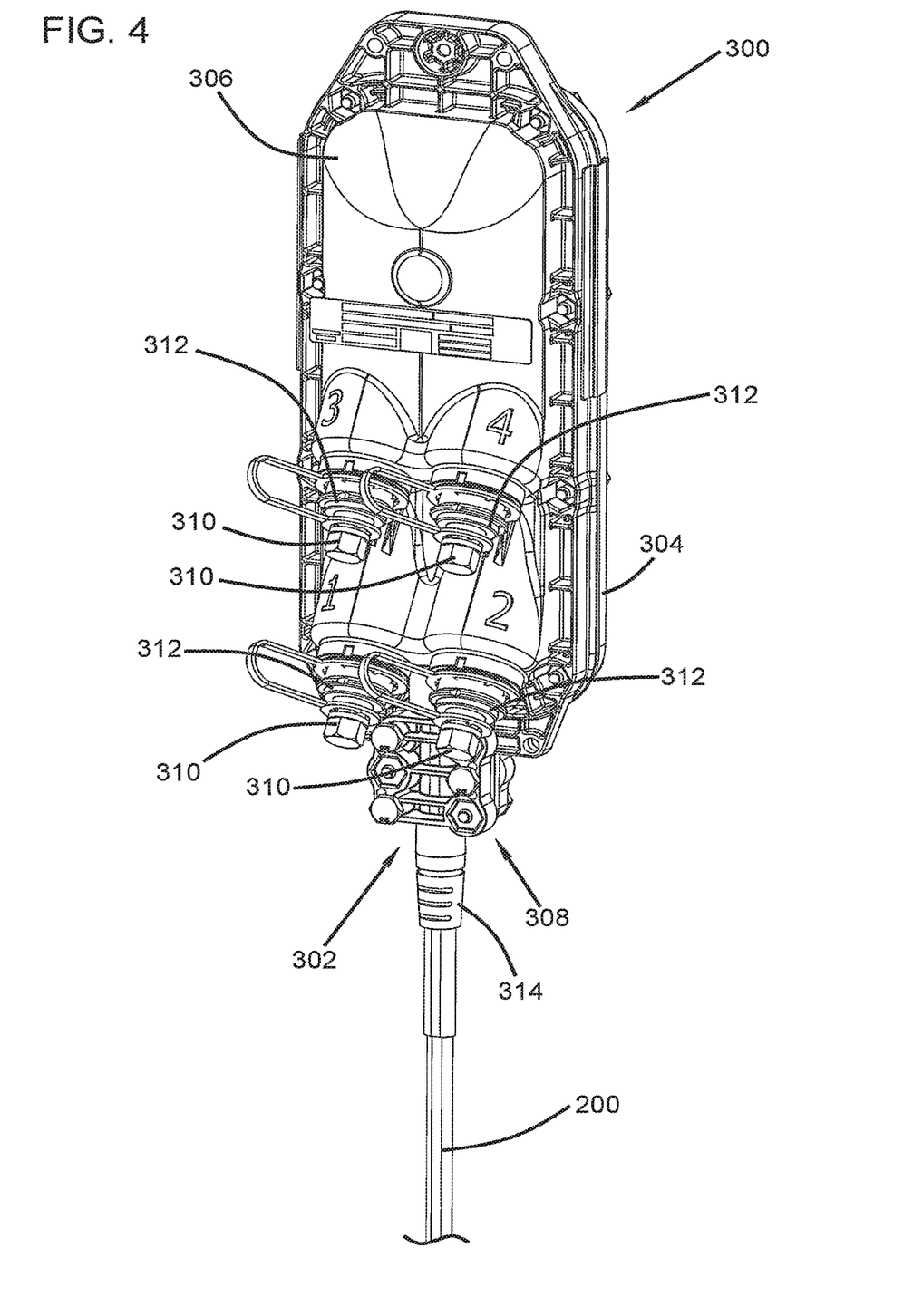
FIG. 4 depicts an example cable terminal terminating the stub cable of FIG. 1 in accordance with the present disclosure.

Referring now to FIG. 4, an example cable terminal 300 is shown. The cable terminal 300 can be used as a drop terminal. The proximal end 201 (FIG. 2) of the stub cable 200 has been sealingly received by a primary cable port 302, which provides access for the stub cable 200 and the optical fibers it carries to the interior volume defined by the base 304 and the cover 306 of the terminal 300, which are sealingly and removably coupled together. The primary cable port 302 can be partially defined by both the base 304 and the cover 306 and opens at a side 308 of the terminal 300.

Each of four plugs 310 is coupled to the cover 306 and is shown sealing one of four secondary ports 312 also defined by the cover 306. Alternatively, any number of secondary ports can be provided. Optionally, the secondary ports 312 house adapters for optically connecting optical fibers (e.g., from a main cable) to the optical fibers 208. Thus, in some examples, the adapters of the secondary ports 312 are adapted to receive connectorized optical fibers.

Proximal ends of the optical fibers 208 can be routed within the interior volume defined by the cable terminal 300 from the proximal end 201 of the stub cable 200 to the secondary ports 312 where they can be optically connected to optical fibers from the main cable. In this manner, the interior volume of the cable terminal, and structures therein, can serve to break out the optical fibers from the main cable and/or from the stub cable 200.

Optionally, a strain relief boot 314 can be provided toward the proximal end of the stub cable 200 to prevent over-bending of the optical fibers 208 where the stub cable 200 joins the cable terminal 300.

The cable terminal 300 is a non-limiting example of cable terminals in accordance with the present disclosure. Generally speaking, example cable terminals in accordance with the present disclosure include an enclosure having a plurality of hardened/ruggedized ports that are environmentally sealed relative to the enclosure, each of the hardened/ruggedized ports adapted to receive a ruggedized/hardened fiber optic connector from outside the enclosure. The cable terminal includes a pushable stub cable holding at least one optical fiber optically coupled to the hardened/ruggedized ports. In some examples, the number of optical fibers included in the stub cable can equal the number of hardened/ruggedized ports of the cable terminal with each optical fiber being optically coupled to one of the ports. For example, for a 4 port cable terminal the stub cable would have 4 optical fibers, for an 8 port cable terminal the stub cable would have 8 optical fibers, and for a 12 port cable terminal the stub cable would have 12 fibers. Higher fiber counts could also be used. In other examples, the stub cable can have a single optical fiber and the enclosure can include a passive optical power splitter or wavelength division multiplexer having an input side coupled to the fiber of the stub cable and an output side having outputs coupled to each of the hardened/ruggedized ports.

The cable terminal 300 can be positioned on the ground, above the ground, or below the ground (e.g., in a hand hole). Once situated, the stub cable 200 can be distally advanced through a conduit as described in more detail below.

Non-limiting examples of the cable terminals that can be used with stub cables in accordance with the present disclosure are described in U.S. Pat. Nos. 7,558,458 and 7,292,763, the contents of which patents are hereby fully incorporated by reference in their entireties.

Figure 5:
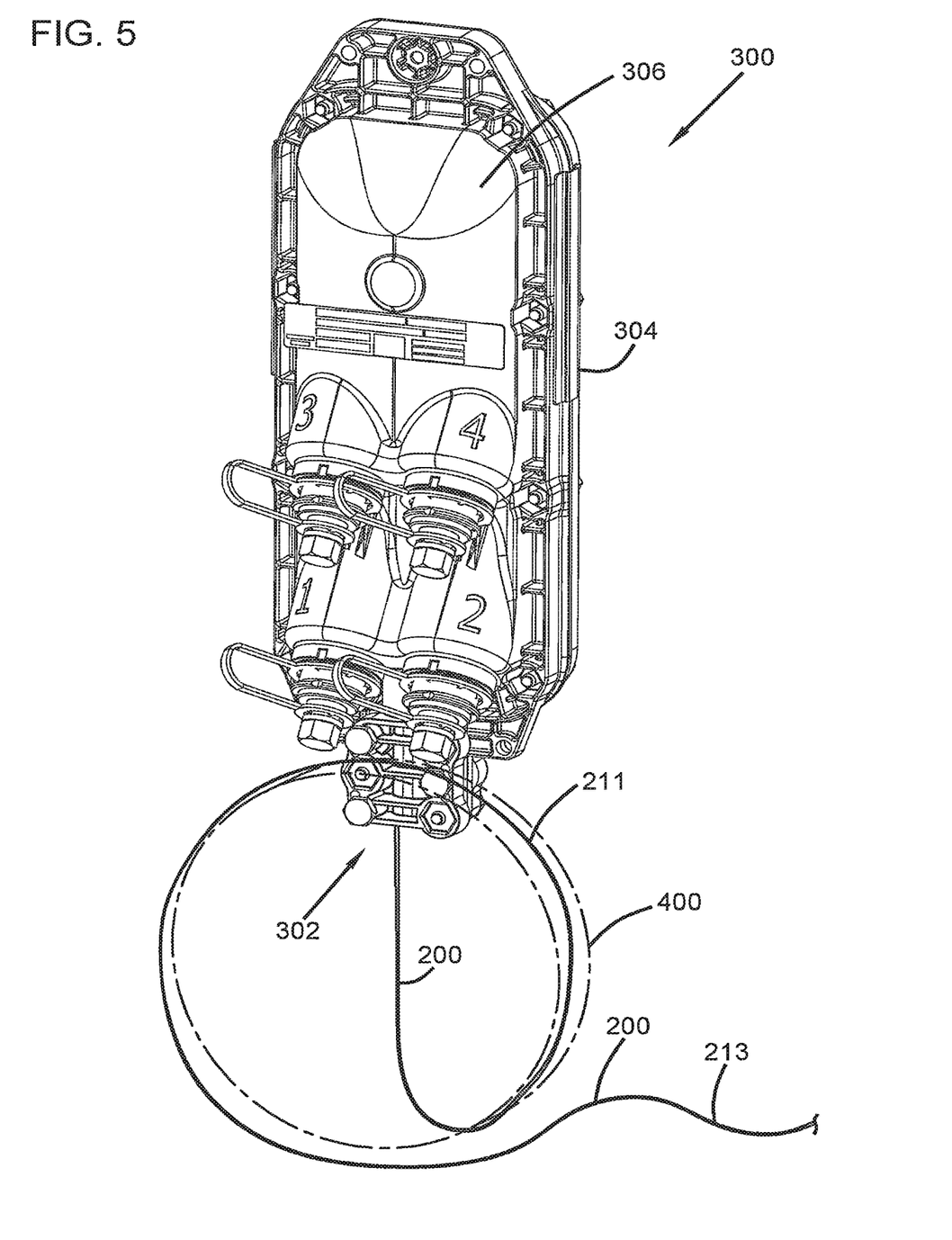
FIG. 5 depicts the cable terminal of FIG. 4 and schematically depicts a stub cable organizing structure for organizing the stub cable of FIG. 1.

Referring now to FIG. 5, optionally an undeployed length 211 (i.e., slack) of the stub cable 200 can be organized and stored on an organizing structure 400. In non-limiting examples, the organizing structure is a spool or includes a spool component and/or one or more bend radius limiters, and the slack 211 of the stub cable 200 can be spooled or otherwise organized thereabout. Thus, in some examples, the stub cable 200 is sufficiently flexible to be spooled on a spool of a given spool radius and still meet pushability characteristics defined herein. The organizing structure can be mounted to or integrally formed with the cable terminal 300, e.g., integrally formed with the cover 306 or the base 304.

Advancing of a deployed length 213 of the stub cable 200 into a conduit will be described below in conjunction with FIG. 6. Optionally, a deploying mechanism can be provided in addition to, or integral with, the cable terminal 300 and/or the organizing structure 400. Such a deploying mechanism can be, e.g., an electrical/motorized mechanism adapted to apply an advancing force to the stub cable 200 at a location proximal to a proximal end of a conduit, i.e., at a location at or near the cable terminal 300. Optionally a controller can be provided to control such a deploying mechanism and e.g., start, stop, and/or adjust the pace of deployment. Optionally, such a deploying mechanism can be connected to a power source and/or a controller, and include one or more drivers.

Figure 6:
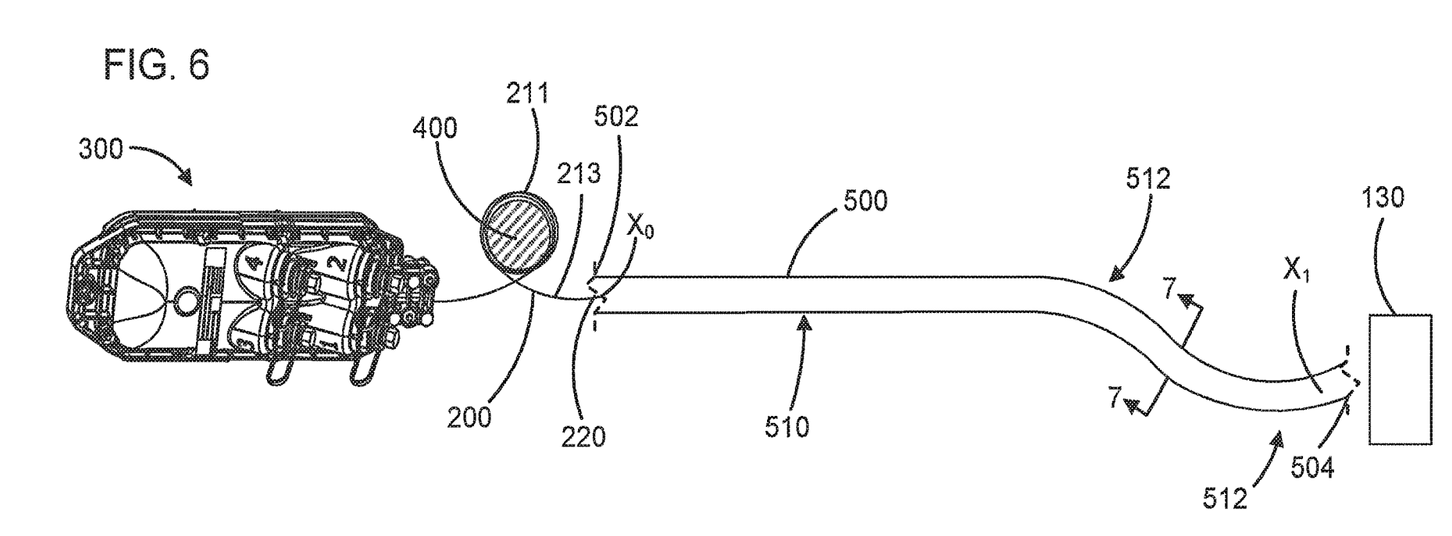
FIG. 6 depicts the cable terminal of FIG. 4 and schematically depicts the stub cable organizing structure of FIG. 5, the stub cable of FIG. 1, a conduit, and a fiber distribution hub.

Referring to FIG. 6, the stub cable 200, having distal end 220 and having spooled length 211, is positioned to be distally advanced into a conduit 500 via the conduit's proximal end 502. The conduit 500 has a distal end 504 at or near a fiber distribution hub 130 and a proximal end 502 at or near the primary port of the cable terminal 300, and is radially enclosed surrounding its longitudinal axis. The conduit 500 includes at least one straight section 510 and/or at least one curved section 512. The conduit 500 can run entirely or partly on the ground, above the ground (e.g., in an aerially suspended manner), or below the ground.

The conduit can have a transversely round cross-section or, alternatively, any other cross-section. The cross-section can optionally vary in size and/or shape along the longitudinal length of the conduit.

Figure 7:
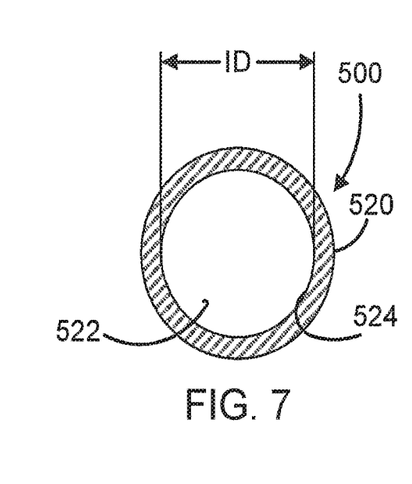
FIG. 7 depicts a cross-section of the example conduit of FIG. 6 along the line 7-7 in FIG. 6.

Referring to FIG. 7, the conduit 500 has a wall 520 that defines an open channel 522 through which the stub cable 200 can be advanced. The conduit 500 has a minimum inner diameter or width (i.e., a minimum passage diameter) ID that corresponds to the smallest width/diameter of the channel 522 along the advancing distance of the stub cable 200.

In some examples, the inner diameter ID is smaller than a minimum cross-dimension of the assembled cable terminal 300, e.g., a minimum cross-dimension of the terminal 300 perpendicular to the cable axis in FIG. 4. In other words, the inner diameter ID of the conduit is small enough that the assembled cable terminal is not passable therethrough. In particular examples, the inner diameter ID is less than or equal to 12 millimeters (mm), or less than or equal to 8 mm, or less than or equal to 6 mm, or less than or equal to 5 mm.

Referring to FIGS. 6-7, a minimum pushable advancing distance is defined as the distance traveled by the distal end 220 of the stub cable 200 from its initial entry location x0 into the conduit 500 to another location x1 within the conduit that is distal from the entry location x0, where the only advancing force applied to the stub cable 200 is from a position that is proximal to the proximal end 502 of the conduit 500. Thus, the distance from x0 to x1 is defined by the conduit 500 and does not necessarily refer to a straight line (shortest) distance between x0 and x1. In particular examples, the minimum pushable advancing distance is at least 10 meters (m), or at least 50 m, or at least 100 m, or at least 500 m, or at least 1,000 m, or more.

It should be appreciated that the location x1 alternatively can be located distally beyond the distal end 504 of the channel 500, such that the minimum pushable advancing distance is longer than the channel 500 itself.

In some examples, one or more structural attributes of the stub cable 200 (including, e.g., the stub cable's rigidity, flexibility/resilience, and/or frictional characteristics of its outer surface 203) is/are such that the distance from x0 to x1 is at least partially a function of the minimum inner diameter or width ID of the conduit 500 and/or the maximum outer diameter OD of the stub cable 200. Generally speaking but not necessarily in every application, for a given stub cable, the larger the conduit is compared to the stub cable (i.e., the larger the ratio of ID/OD), the longer will be the distance from x0 to x1.

In some examples, one or more structural attributes of the stub cable 200 (including, e.g., the stub cable's rigidity, flexibility/resilience, and/or frictional characteristics of its outer surface 203) is/are selected such that the distance from x0 to x1 is at least partially a function of the path defined by the conduit 500, the path including the at least one straight section 510 and/or the at least one curved section 512. Generally speaking but not necessarily in every application, for a given stub cable, the smaller the curvature of the path defined by the conduit, the longer will be the distance from x0 to x1.

In some examples, one or more structural attributes of the stub cable 200 (including, e.g., the stub cable's rigidity, flexibility/resilience, and/or frictional characteristics of its outer surface 203) is/are selected such that the distance from x0 to x1 is at least partially a function of a total curvature of the conduit 500 between x0 and x1, where the total curvature is defined according to the follow equation (1) as:

$$\alpha \int_{x0}^{x1} \frac{1}{r} dx, \tag{1}$$

where $\alpha$ is a constant, and $r$ is the radius of curvature of the conduit 500.

In some examples, one or more structural attributes of the stub cable 200 (including, e.g., the stub cable's rigidity, flexibility/resilience, and/or frictional characteristics of its outer surface 203) is/are selected such that the distance from x0 to x1 is at least partially a function of a total twisting of the conduit 500 between x0 and x1, where twisting is defined as a curvature of the conduit that has both a horizontal component and a vertical component.

In some examples, the distance from x0 to x1 is at least partially a function of the frictional characteristics of the inner surface 524 (FIG. 7) of the conduit 500 (FIG. 7). Generally speaking, the smaller the coefficient(s) of friction of the inner surface 524, the longer is the distance from x0 to x1. Generally speaking, the smaller the coefficient(s) of friction of the outer surface 203 of the stub cable 200, the longer is the distance from x0 to x1.

In some examples, the distance from x0 to x1 is at least 50 times, at least 100 times, at least 500 times, at least 1,000 times, at least 5,000 times, at least 10,000 times (or more) the minimum inner diameter or width ID of the conduit 500, the minimum inner transverse diameter or width of the conduit being smaller than a minimum cross-dimension of the closure of the cable terminal 300.

Non-limiting examples of pushable multi-fiber stub cables that can be terminated at cable terminals and pushed distally through conduits in accordance with the present disclosure will now be described. Each of these stub cables includes at least one of the pushability characteristics described herein. Regardless of how many fibers are depicted, it should be appreciated that each of these stub cables can be configured to carry any suitable number of optical fibers.

Figure 8:
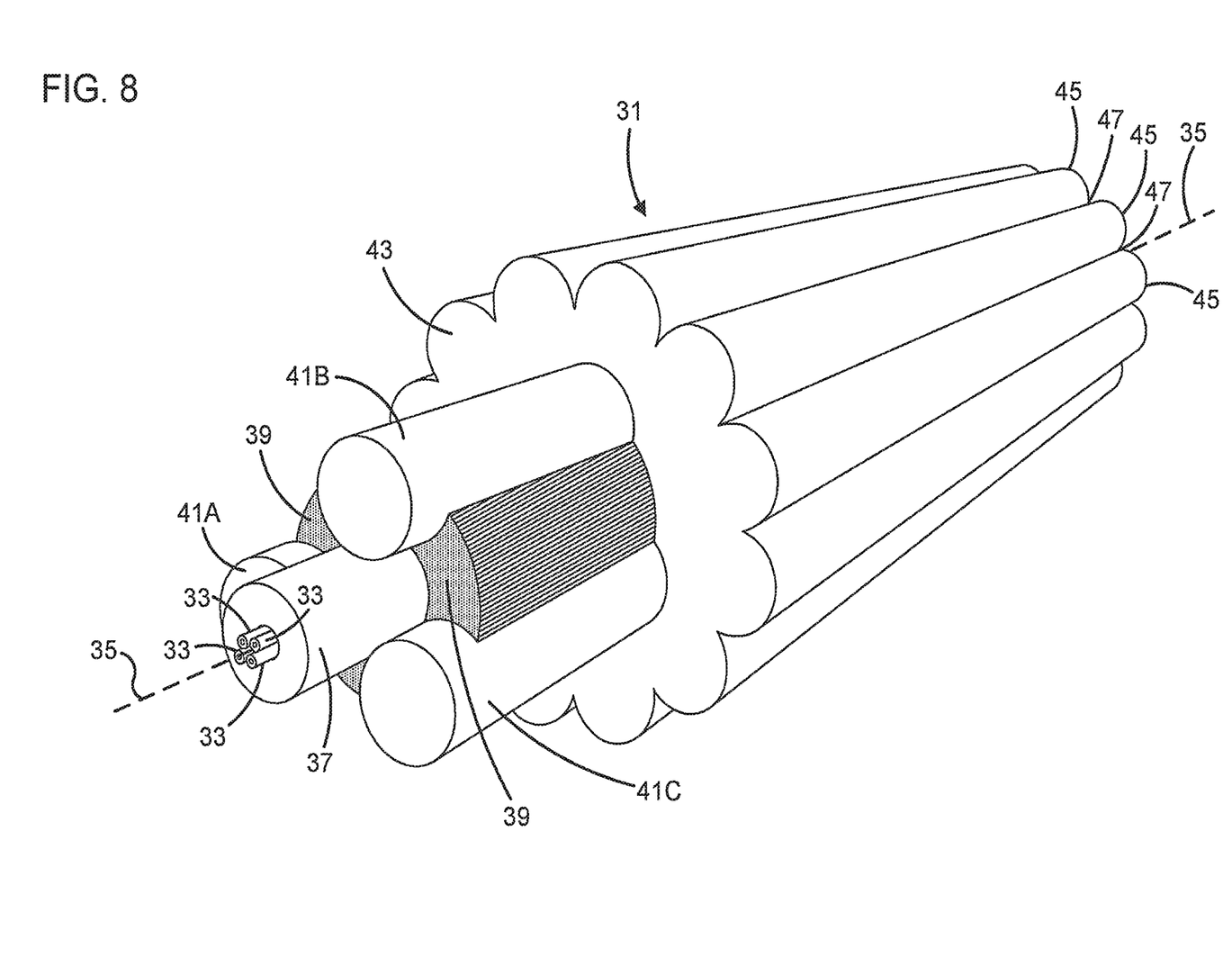
FIG. 8 is a perspective view of a portion of an embodiment of a pushable stub cable that can be terminated at a cable terminal in accordance with the present disclosure, the pushable stub cable carrying a plurality of optical fibers and having an outer jacket with an outer surface defining a first configuration of projections projecting away from the stub cable's longitudinal axis.

Referring to FIG. 8, the stub cable 31 includes an inner core with a member for transmitting data signals, the member being a plurality of optical fibers 33, such as 250 micron diameter optical fibers. The optical fibers 33 are parallel to a center/longitudinal axis 35 of the stub cable 31. A buffer tube 37 surrounds the optical fiber 33. The buffer tube/inner tube 37 is centered along the axis 35 of the stub cable 31. It should be appreciated that any number of optical fibers 33 may be located within the buffer tube 37, such as two, four, eight, or even up to twenty-four optical fibers. Also, FIG. 8 shows loose optical fibers 33 within the opening of the buffer tube 37. Instead of a "loose-tube" arrangement, the invention may include a "tight-tube" arrangement.

Optionally, the inner core of the stub cable 31 also includes a plurality of flaccid strength members. In one embodiment, the flaccid strength members are fibers or yarns 39 completely surrounding the buffer tube 37. The yarns 39 may be constructed of aramid yarns, such as those sold under the trademark of KEVLAR.

Optionally, at least one rigid strength member 41 is provided within the inner core. In the embodiment of FIG. 8, three glass reinforced plastic (GRP) rods 41A, 41B and 41C are spaced evenly, e.g., at equal intervals of one hundred twenty degrees apart, around the buffer tube 37. The rigid strength members 41 are disposed within the yarns 39. Although GRP rods have been described, other types of rigid rods may be substituted. Also, the three rigid strength members 41A, 41B and 41C may be replaced by two rigid strength members 41A and 41B spaced one hundred and eighty degrees apart, e.g., on opposite sides of the buffer tube 37.

A jacket 43 surrounds the inner core. More specifically, the jacket 43 surrounds the optical fibers 33, the buffer tube 37, the yarns 39 and the rigid strength members 41A, 41B and 41C. The jacket 43 has an undulating thickness entirely around the inner core to form a plurality of alternating projections 45 and valleys 47 on the outer surface of the jacket 43. The projections 45 and valleys 47 extend along the length of the stub cable 31. The plural projections 45 include at least five projections 45 with a valley 47 formed between each adjacent pair of projections 45. In the embodiment shown in FIG. 8, there are twelve projections 45. However, more or fewer projections 45 may be included, such as six, eight, nine, ten, fourteen, fifteen, etc.

Figure 9:
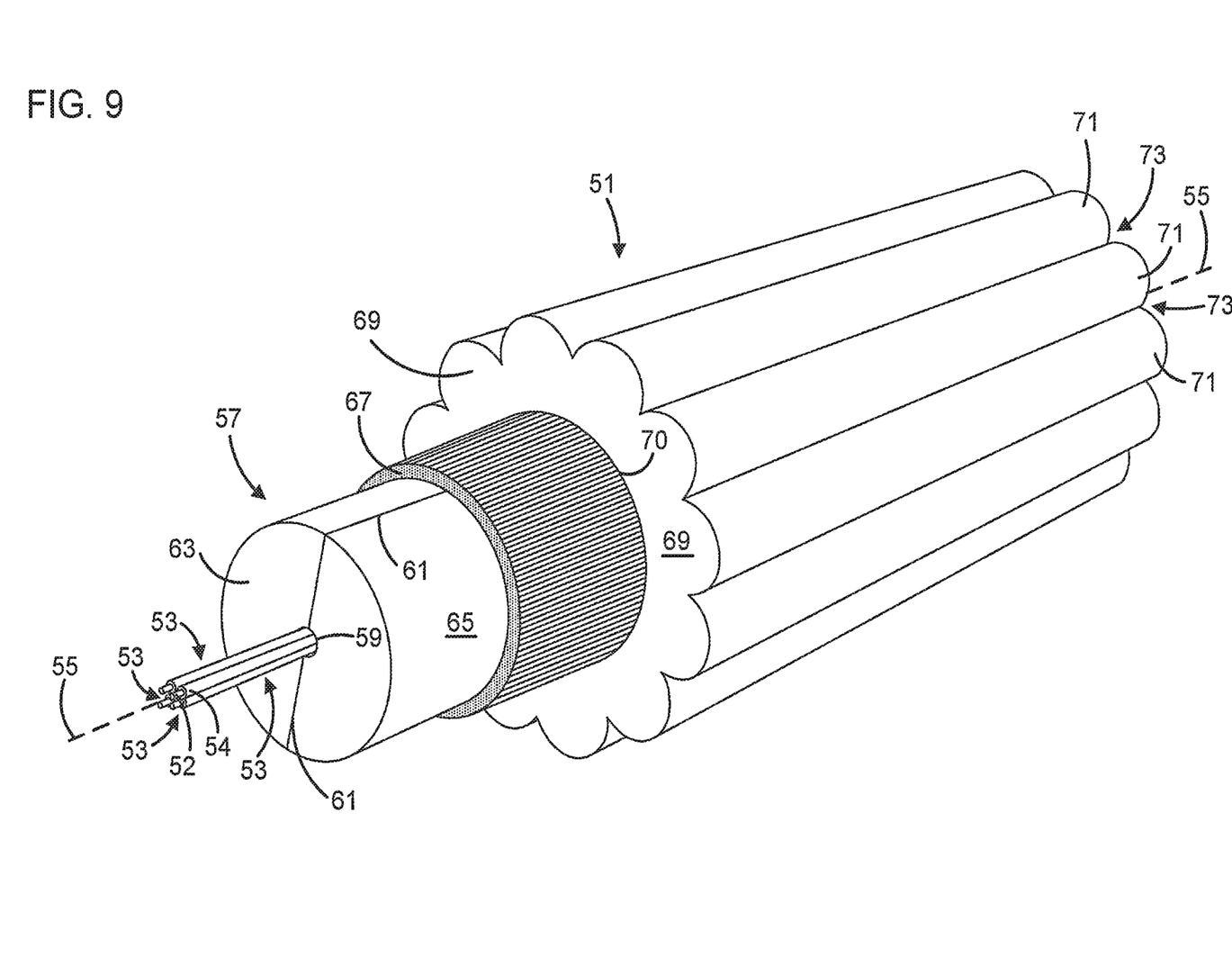
FIG. 9 is a perspective view of a portion of a further embodiment of a pushable stub cable that can be terminated at a cable terminal in accordance with the present disclosure, the pushable stub cable carrying a plurality of optical fibers and having an outer jacket with an outer surface defining a configuration of projections projecting away from the stub cable's longitudinal axis.

Referring to FIG. 9, the stub cable 51 has an inner core with a plurality of optical fibers 53. The optical fibers 53 are parallel to a center axis 55 of the stub cable 51, and may include a cladding layer 54 surrounding a light carrying core 52.

No buffer tube is provided in the stub cable 51. Rather, a single rigid strength member 57 is provided in the inner core. The rigid strength member 57 can have one or more hollow channels 59, and the optical fibers 53 can reside within the channels 59. The diameter of the channels 59 may be adapted to accommodate larger and more numerous optical fibers 53 that may reside within the channel 59, e.g., up to twenty four optical fibers may reside within a larger channel 59.

The rigid strength member 57 is formed as a rigid cylindrical rod with a circular cross sectional shape. A central axis of the rigid strength member 57 resides along the center/longitudinal axis 55 of the stub cable 51. A break line 61 passes through the channel 59 and divides the rigid strength member 57 into first and second mirror symmetrical halves 63 and 65.

The inner core of the stub cable 51 also includes a plurality of flaccid strength members. In one embodiment, the flaccid strength members are fibers or yarns 67 completely surrounding the rigid strength member 57, and form a layer approximately 0.3 mm thick. As noted above, the yarns 67 may be constructed of aramid yarns, such as those sold under the trademark of KEVLAR.

A jacket 69 surrounds the inner core. More specifically, the jacket 69 surrounds the optical fibers 53, the rigid strength member 57, and the yarns 67. The jacket 69 presents an inner wall 70 with a circular cross sectional shape, which faces to the inner core. The jacket 69 has an undulating thickness entirely around the inner core to form a plurality of alternating projections 71 and valleys 73 on the outer surface of the jacket 69. The projections 71 and valleys 73 extend along the length of the stub cable 51.

The plurality of projections 71 include at least five projections 71 with a valley 73 formed between each adjacent pair of projections 71. In the embodiment shown in FIG. 9 there are twelve projections 71. However, more or fewer projections 71 may be included, such as six, eight, nine, ten, fourteen, fifteen, etc. The overall diameter D1 (outer dimeter) of the stub cable 51 is approximately or less than 5 mm. The projection height P1 for each projection is approximately 0.5 mm.

In the embodiment shown in FIG. 9, the projections 71 touch each other to form a valley 73 with a deep V-shape. Alternatively, the projections 71 may be slightly spaced from each other so that a short segment of a curved floor is formed between the projections 71.

Figure 10:
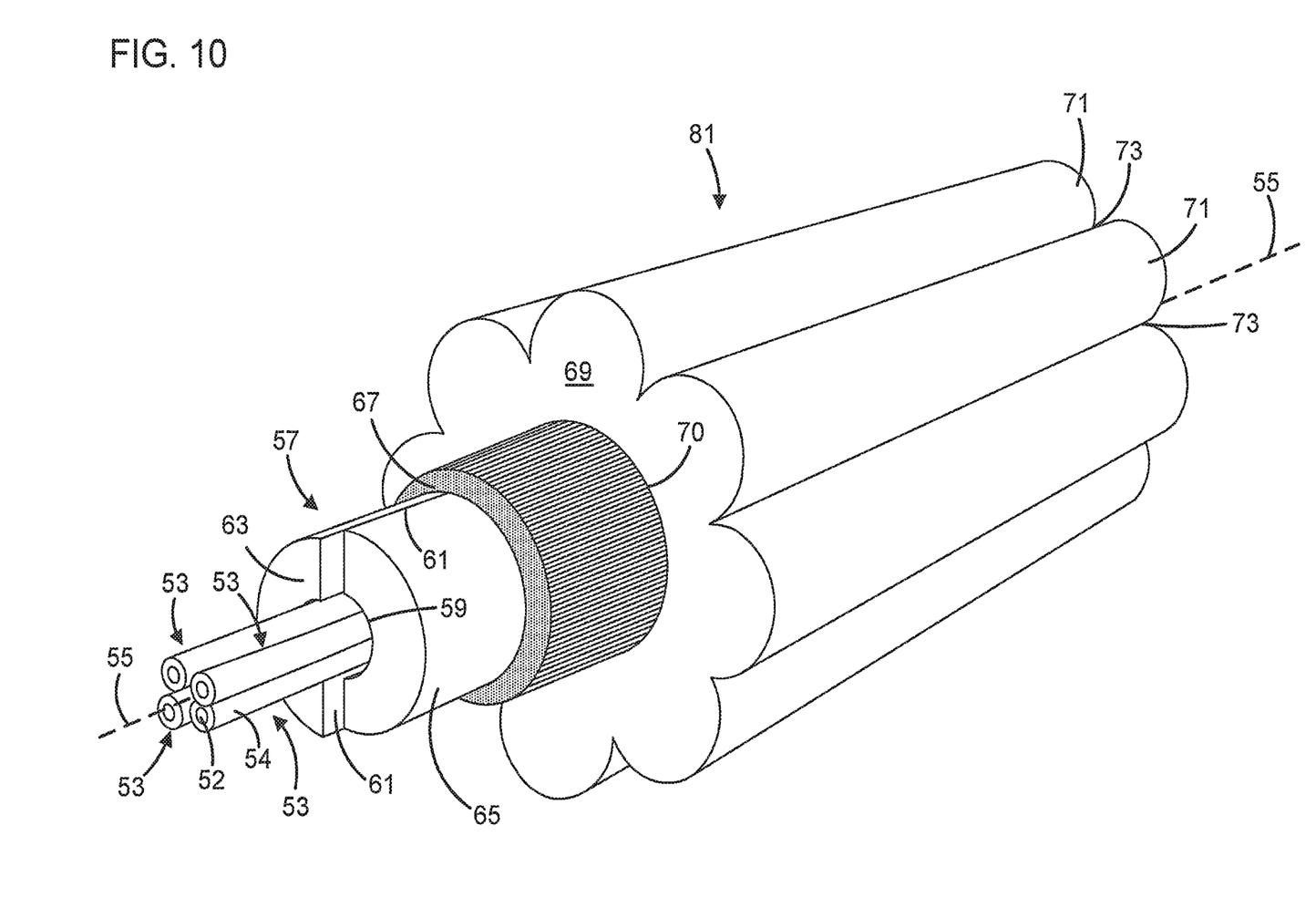
FIG. 10 is a perspective view of a portion of a further embodiment of a pushable stub cable that can be terminated at a cable terminal in accordance with the present disclosure, the pushable stub cable carrying a plurality of optical fibers and having an outer jacket with an outer surface defining a second configuration of projections projecting away from the stub cable's longitudinal axis.

Referring to FIG. 10, the stub cable 81 is constructed almost identically to the cable 51 of FIG. 9. Therefore, like structures have been identified using the same reference numerals as used in FIG. 9. The cable 81 is generally smaller than the cable 51. Some notable corresponding differences are that the number of projections 71 is illustrated to be eight, and the number of valleys 73 is likewise eight. The overall diameter D2 (outer diameter) of the stub cable 81 is approximately 3.5 mm. The projection height P2 for each projection is approximately 0.48 mm. The diameter of the rigid strength member 57 is about 1 mm, and the thickness of the layer of yarns 67 is about 0.4 mm.

Figure 11:
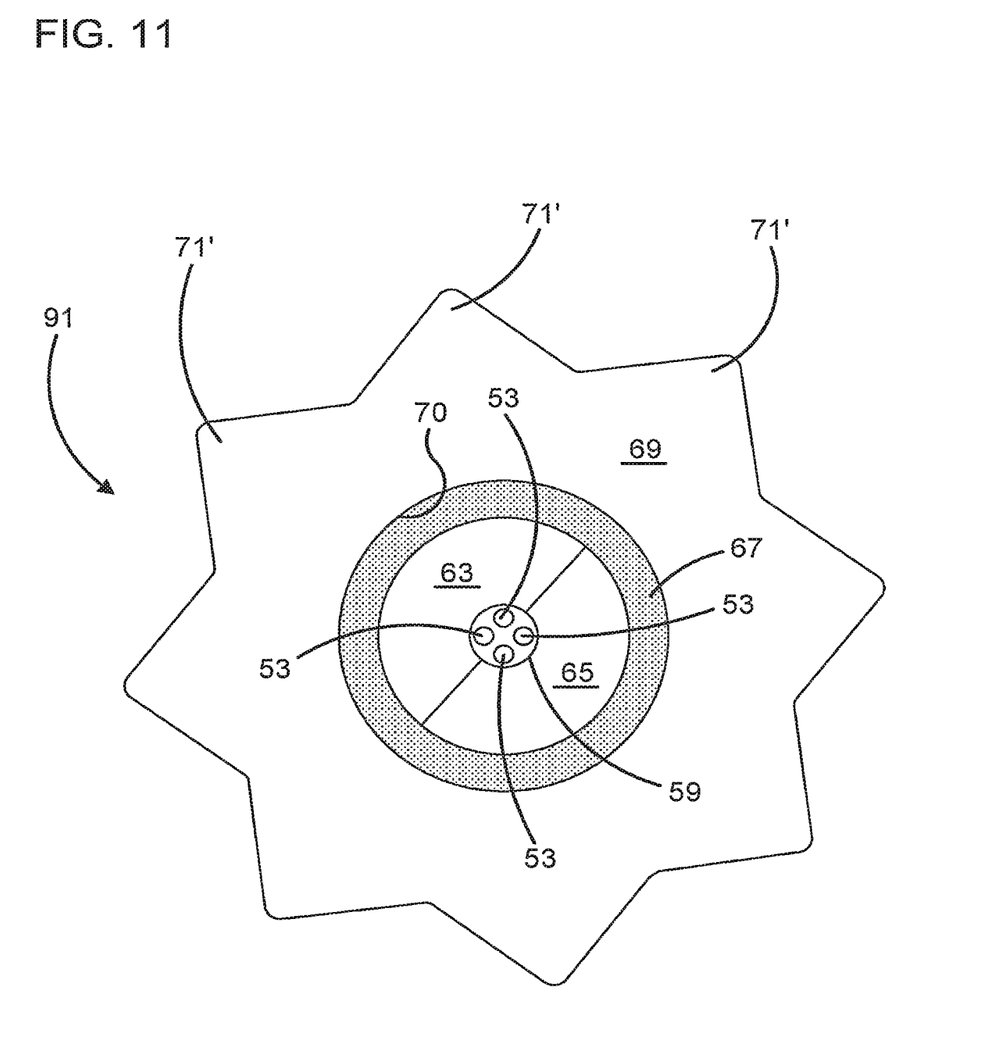
FIG. 11 is a transverse cross-sectional view of a further embodiment of a pushable stub cable that can be terminated at a cable terminal in accordance with the present disclosure, the pushable stub cable carrying a plurality of optical fibers and having an outer jacket with an outer surface defining a third configuration of projections projecting away from the stub cable's longitudinal axis.

Referring to FIG. 11, the stub cable 91 shares features with other stub cables described herein, except that the projections 71' have a triangular transverse cross-sectional shape.

Although in the foregoing description, terms such as "proximal," "distal," etc. were used for ease of description and illustration in relating features to one another, no restriction on the use of the components and assemblies of this disclosure is intended by such use of the terms.

Having described the preferred aspects and embodiments of the present disclosure, modifications and equivalents of the disclosed concepts may readily occur to one skilled in the art. However, it is intended that such modifications and equivalents be included within the scope of the claims which are appended hereto.

What is claimed is:

1. A method of routing at least one optical fiber, comprising:

providing a fiber optic cable terminal or a drop terminal and a spool, the cable terminal or the drop terminal comprising an enclosure having a plurality of ruggedized ports that are environmentally sealed relative to the enclosure, each of the ruggedized ports being adapted to receive a ruggedized fiber optic connector from outside the enclosure, the fiber optic cable terminal or the drop terminal including a stub cable connected to the enclosure at a proximal end of the stub cable, the stub cable including the at least one optical fiber and a jacket surrounding the at least one optical fiber; and while (i) the enclosure is environmentally sealed, (ii) the proximal end of the stub cable is positioned within the enclosure, and (iii) an entirety of the spool is separated from the fiber optic cable terminal or the drop terminal, advancing a distal end of the stub cable distally into a conduit by at least a minimum distance, the advancing including unspooling a spooled length of the stub cable from the spool, wherein the minimum distance is at least 50 times a minimum inner transverse width of the conduit; and wherein the minimum inner transverse width of the conduit is smaller than a minimum cross-dimension of the enclosure.

2. The method of claim 1, further comprising determining the minimum distance based on one or more of: a rigidity of the stub cable, a flexibility of the stub cable, a coefficient of friction of an outer surface of the stub cable, a coefficient of friction of an inner surface of the conduit, the minimum inner transverse width of the conduit, a curvature of the conduit, a twisting of the conduit, and a maximum outer width of the stub cable.

3. The method of claim 1, wherein the cable terminal or the drop terminal and at least a portion of the conduit extending distally from the proximal end of the conduit are underground.

4. The method of claim 1, wherein the cable terminal or the drop terminal is coupled to a telecommunications pole, and wherein at least a portion of the conduit is aerially suspended.

5. The method of claim 1, wherein the stub cable includes at least one rigid strength member surrounded by the jacket.

6. The method of claim 1, wherein the stub cable is pushable, and wherein advancing the distal end of the stub cable includes pushing the distal end of the stub cable.

7. The method of claim 1, wherein the minimum distance is at least 100 times the minimum inner transverse width of the conduit.

8. The method of claim 1, wherein the minimum distance is at least 1,000 times the minimum inner transverse width of the conduit.

9. The method of claim 1, wherein the stub cable is sealingly received in a primary cable port defined by the fiber optic cable terminal or the drop terminal.

10. The method of claim 9, wherein a strain relief boot is provided around the stub cable adjacent to the primary cable port.

11. A method of routing at least one optical fiber, comprising:
providing a fiber optic cable terminal or a drop terminal and a spool, the cable terminal or the drop terminal comprising an enclosure having a plurality of ruggedized ports that are environmentally sealed relative to the enclosure, each of the ruggedized ports being adapted to receive a ruggedized fiber optic connector from outside the enclosure, the fiber optic cable terminal or the drop terminal including a stub cable connected to the enclosure at a proximal end of the stub cable, the stub cable including the at least one optical fiber and a jacket surrounding the at least one optical fiber; and
advancing a distal end of the stub cable distally into a conduit by at least a minimum distance, the advancing including unspooling a spooled length of the stub cable from the spool,
wherein the minimum distance is at least 50 times a minimum inner transverse width of the conduit;
wherein the minimum inner transverse width of the conduit is smaller than a minimum cross-dimension of the enclosure; and
wherein the jacket has an undulating thickness which results in a plurality of projections formed on an outer surface of the jacket, the projections extending along a longitudinal length of the cable.

12. The method of claim 11, wherein in cross section, each of the projections presents about half of an ellipse.

13. The method of claim 11, wherein in cross section, each of the projections presents an approximate triangle.

14. A method of routing at least one optical fiber, comprising:
providing a fiber optic cable terminal or a drop terminal and a spool, the cable terminal or the drop terminal comprising an enclosure having a plurality of ruggedized ports that are environmentally sealed relative to the enclosure, each of the ruggedized ports being adapted to receive a ruggedized fiber optic connector from outside the enclosure, the fiber optic cable terminal or the drop terminal including a stub cable connected to the enclosure at a proximal end of the stub cable, the stub cable including the at least one optical fiber and a jacket surrounding the at least one optical fiber; and
advancing a distal end of the stub cable distally into a conduit by at least a minimum distance, the advancing including unspooling a spooled length of the stub cable from the spool,
wherein the minimum distance is at least 50 times a minimum inner transverse width of the conduit;
wherein the minimum inner transverse width of the conduit is smaller than a minimum cross-dimension of the enclosure; and
wherein an outer surface of the jacket defines flutes or ribs distributed about a perimeter of the outer surface of the jacket for reducing friction with the conduit through which the stub cable is pushed.

15. The method of claim 14, wherein the flutes or ribs extend longitudinally along an axial length of the stub cable.

* * * * *